United States Patent [19]

Bucksch

[11] Patent Number: 4,459,869
[45] Date of Patent: Jul. 17, 1984

[54] LUBRICATING ARRANGEMENT FOR PLANET-GEAR BEARING

[75] Inventor: Manfred Bucksch, Friedrichshafen, Fed. Rep. of Germany

[73] Assignee: Zahnradfabrik Friedrichshafen, A.G., Friedrichshafen, Fed. Rep. of Germany

[21] Appl. No.: 250,026

[22] Filed: Apr. 1, 1981

[30] Foreign Application Priority Data

Apr. 2, 1980 [DE] Fed. Rep. of Germany ....... 3012846

[51] Int. Cl.³ ................... F16H 57/04; F01M 9/00
[52] U.S. Cl. ...................................... 74/467; 184/6.12
[58] Field of Search ................... 74/467; 184/6.12

[56] References Cited

U.S. PATENT DOCUMENTS

| | | | |
|---|---|---|---|
| 2,516,200 | 6/1950 | Geyer | 184/6.12 |
| 2,968,190 | 1/1961 | Orr | 74/467 |
| 3,539,035 | 11/1970 | Wolkenstein | 74/467 |
| 3,583,526 | 6/1971 | Mulleder et al. | 74/467 |
| 3,650,353 | 3/1972 | Abbott | 74/801 |
| 3,821,908 | 7/1974 | Marsch et al. | 74/801 |
| 3,834,248 | 9/1974 | Caliri | 74/467 |
| 4,104,933 | 8/1978 | Campbell | 184/6.12 |
| 4,148,229 | 4/1979 | Kuramochi et al. | 74/467 |
| 4,346,624 | 8/1982 | Nagasaki et al. | 74/467 |

FOREIGN PATENT DOCUMENTS

| | | |
|---|---|---|
| 2005684 | 9/1970 | Fed. Rep. of Germany . |
| 2716493 | 10/1978 | Fed. Rep. of Germany . |
| 2734563 | 2/1979 | Fed. Rep. of Germany . |
| 3012846 | 10/1981 | Fed. Rep. of Germany . |
| 609531 | 8/1926 | France . |
| 2035654 | 9/1970 | France . |
| 1340593 | 12/1973 | United Kingdom . |

Primary Examiner—Leslie A. Braun
Assistant Examiner—Michael D. Bednarek
Attorney, Agent, or Firm—Karl F. Ross; Herbert Dubno

[57] ABSTRACT

A planetary-gear assembly has a planet gear carrier constituted by a pair of axially spaced carrier plates bridged by a plurality of axially extending pins each carrying a respective planet gear by means of a respective bearing. An adjacent member rotatable independently of the planet carrier forms with the planet carrier an annular chamber centered on the axis. This annular chamber is closed axially by the one carrier plate and the adjacent member and is closed radially outwardly by a seal ring engaging between this one carrier plate and the adjacent member. Each of the pins is formed with a throughgoing passage opening axially into this annular chamber and radially at the respective bearing. Liquid lubricant is fed to the chamber radially inwardly of these passages so as the assembly rotates the lubricant will be forced radially outwardly, filling the radial outward portion of the chamber and forcing the lubricant through the passage to the bearings.

6 Claims, 1 Drawing Figure

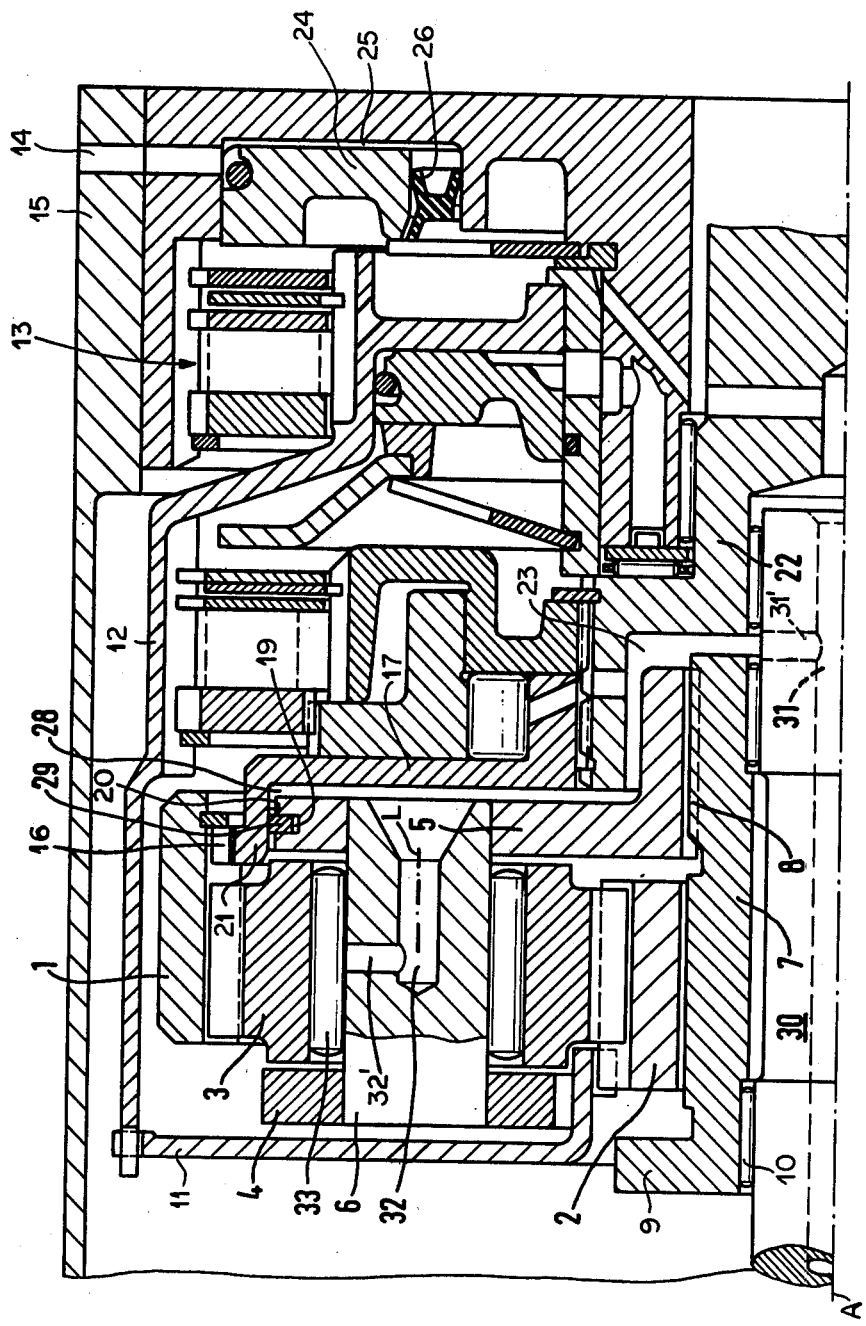

# 4,459,869

LUBRICATING ARRANGEMENT FOR PLANET-GEAR BEARING

FIELD OF THE INVENTION

The present invention relates to a planetary-gear assembly. More particularly this invention concerns a system for lubricating the bearings carrying the planet gears of such an assembly.

Background of the Invention

In a planetary-gear assembly having a planet carrier rotatable about an axis and provided with a plurality of axially extending pins each provided with a bearing on which rides a respective planet gear, it is essential that these planet-gear bearings be thoroughly lubricated at all times. The planet carrier of a typical assembly is constituted by a pair of axially spaced plates bridged by the planet-carrying pins. The plates are, in turn, normally rotatable on a central shaft. Accordingly it is a standard practice to pump a liquid lubricant axially in through a passage in the shaft, and radially out through branch passages in the central shaft into a groove formed in one of the plates and communicating via a mainly radially extending passage extending through this carrying plate and bearing pin to the bearing. Such an arrangement requires that the carrier member be relatively thick to allow for this radially throughgoing passage, and necessitates relatively complex machining operations.

It has also been suggested to provide a lubricant-trapping plate which is mounted on one of the side plates of the carrier member and which catches radially outwardly moving liquid lubricant and deflects it into a passage opening at one end at this trapping plate and the other end of the bearing. Obviously this expedient also substantially increases the axial length of the planetary-gear assembly incorporating it.

Objects of the Invention

It is therefore an object of the present invention to provide an improved planetary-gear assembly.

Another object is to provide such an assembly which has an improved lubrication system.

Summary of the Invention

These objects are attained according to the instant invention in a planetary-gear assembly having a planet-carrier member rotatable about an axis and having at least one axially extending pin offset from the axis and carrying a planet gear by means of a bearing on the pin. An adjacent member forms with this carrier member an annular chamber centered on the axis. The pin is formed with the passage opening radially at the bearing and axially at the carrier member into the chamber. Means is provided for feeding a liquid lubricant to the chamber radially inwardly of the passage and means is also provided including an element for closing the chamber radially outwardly of the passage so that the liquid lubricant fills the chamber on rotation of the members and flows via the passage to the bearing.

According to this invention the adjacent member is rotatable independently of the carrier member about the axis. The element is a seal ring carried on one of the members, normally the carrier member, and slidably engaging the other member.

Thus with the system according to the instant invention an annular pocket of lubricant is formed between two members of the assembly which are already present in the planetary-gear assembly. The adjacent member according to this invention may be a link element connected to the ring gear centered on the axis and meshing with the planet gears. This link member is frequently constituted as the output member of the system. Rotation of the two members centrifugally drives the liquid lubricant radially outwardly so as to fill the radial outer portion of the chamber and force the liquid under considerable pressure through the passage into the bearing. In this manner extremely good and even lubrication of the bearing is insured.

DESCRIPTION OF THE DRAWING

The sole FIGURE of the drawing is an axial section through a planetary-gear assembly according to the instant invention.

SPECIFIC DESCRIPTION

A planetary-gear assembly according to the instant invention has a central normally nonrotatable core shaft 30 extending along an axis A and having an axially throughgoing oil-feed passage 31 provided with at least one radially opening branch 31'. An input drive member 9 is carried via bearings 10 on this shaft 30 and is connected via splines 8 to one end plate 5 of a planet carrier constituted by this plate 5 as well as by another axially spaced plate 4 and pins 6 bridging plates 4 and 5. Each of these pins 6 carries via a respective needle bearing 33 a respective planet gear 3 meshing externally with a ring gear 1 and internally with a sun gear 2 loosely received on the input member 9. An end plate 11 meshes radially inwardly with the sun gear 2 and is connected via a link sleeve 12 to a clutch 13 that can be pressurized via a passage 14 to arrest the sun gear 2 relative to the housing 15 of the planetary-gear assembly. A link plate 17 closely juxtaposed with the one end plate 5 is connected via external teeth 16 to the ring gear 1 and via internal teeth to splining of an output member 22 also rotatable about the axis A. The planetary-gear assembly shown in the drawing is a transmission which can be shifted under load.

According to this invention the pins 6 are each formed with an axially extending passage 32 opening at the chamber or space 28 formed between the plates 17 and 5, which are both relatively imperforate so that the chamber 28 is axially closed. This passage 32 opens via a branch passage 32' underneath the respective bearing 33. In addition the end carrier plate 5 is formed with an outwardly open external groove 19 in which is fitted a seal ring 29 that engages radially outwardly with a cylindrical inner surface 20 formed by an axial extension 21 of the plate 17. Thus this seal ring 29 allows the two plates 5 and 17 to rotate relative to one another, but at the same radially outwardly closes the annular chamber 28 formed between them.

As lubricant oil is fed in through the passages 31 and 31' to a gap 23 between the members 5 and 22 it will be thrown radially outwardly by centrifugal force as the various parts rotate. This oil will therefore move radially outwardly in the compartment 28 to fill it up so that the oil will rise to a radial level indicated at L and will then flow into the passage 32 and thence from the passage 32' to the bearing 33. In this manner an extremely sure and simple lubrication of the bearing 33 is insured.

With the system according to the instant invention, therefore, while adding no extra axial length to the planetary-gear assembly it is possible to insure lubrication of critical bearings 33 that carry the planet gears 3 on the pins 6. Even though the planet carrier 4, 5, 6 carrying the gears 3 by means of the bearings 33 are moving at high speed lubrication will be insured.

The link sleeve 12 is, as described in fuller detail in U.S. Pat. No. 4,391,354, is acted on at its end opposite the end plate 11 by a piston 24 defining with the housing 15 a pressurizable chamber 25 that is annular and sealed around its inner periphery by a Y-section gland-type seal 26 having one Y-arm engaging the piston 24, another Y-arm engaging a boss of the housing 15, and a central Y-leg engaging a belleville spring that urges the piston 24 axially to the right as seen in the drawing.

I claim:

1. A planetary-gear assembly comprising:
    a planet-carrier member rotatable about an axis and having at least one axially extending pin offset from said axis;
    an adjacent member forming with said carrier member an annular chamber centered on said axis and rotatable independently of said carrier member about said axis, the carrier member being formed with a radially outwardly open annular groove open toward said adjacent member, said adjacent member having a cylindrical inner surface juxtaposed with and directed radially inward at said groove;
    a bearing on said pin;
    a planet gear carried by said bearing on said pin, said pin being formed with a passage opening radially at said bearing and axially at said carrier member into said chamber;
    means for feeding a liquid lubricant to said chamber radially inward of said passage; and
    means including a seal ring fitted in said groove and engaging said cylindrical inner surface of said adjacent member for closing said chamber radially outward of said passage, whereby said liquid lubricant fills said chamber on rotation of said members and flows via said passage to said bearing.

2. The assembly defined in claim 1, further comprising:
    a ring gear centered on said axis and meshing with said planet gear radially outside said chamber, said adjacent member being rotationally fixed to said ring gear.

3. The assembly defined in claim 2, further comprising a core shaft extending along said axis and formed with an axially and radially extending passage constituting part of said means for feeding said liquid lubricant to said chamber.

4. The assembly defined in claim 3, further comprising a sun gear carried on said shaft and meshing with said planet gear.

5. The assembly defined in claim 1 wherein said passage has an axially extending leg opening in said chamber and a radially extending leg opening at said bearing.

6. The assembly defined in claim 1 wherein said planet-carrier member includes a pair of axially spaced plates bridged by said pin, one of said plates forming with said adjacent plate said chamber.

* * * * *